(12) United States Patent
Giancarlo et al.

(10) Patent No.: US 8,558,796 B2
(45) Date of Patent: Oct. 15, 2013

(54) OVERLAY KEYBOARD FOR TOUCH SCREEN DEVICES

(75) Inventors: Charles H. Giancarlo, Atherton, CA (US); Gregory G. Raleigh, Woodside, CA (US)

(73) Assignee: Headwater Partners II LLC, Redwood City, CA (US)

( * ) Notice: Subject to any disclaimer, the term of this patent is extended or adjusted under 35 U.S.C. 154(b) by 567 days.

(21) Appl. No.: 12/800,136

(22) Filed: May 6, 2010

(65) Prior Publication Data

US 2010/0302168 A1 Dec. 2, 2010

Related U.S. Application Data

(60) Provisional application No. 61/215,710, filed on May 7, 2009.

(51) Int. Cl.
*G06F 3/02* (2006.01)

(52) U.S. Cl.
USPC .......................................... 345/169; 345/168

(58) Field of Classification Search
USPC ................... 345/168, 169, 173, 178
See application file for complete search history.

(56) References Cited

U.S. PATENT DOCUMENTS

| 6,084,583 | A  | * | 7/2000 | Gerszberg et al. | 715/867 |
| 6,121,960 | A  | * | 9/2000 | Carroll et al. | 345/173 |
| 6,243,080 | B1 | * | 6/2001 | Molne | 345/173 |
| 7,403,191 | B2 | * | 7/2008 | Sinclair | 345/173 |
| 7,705,828 | B2 | * | 4/2010 | Griffin et al. | 345/168 |
| 2002/0118175 | A1 |   | 8/2002 | Liebenow et al. | |
| 2004/0169641 | A1 | * | 9/2004 | Bean et al. | 345/168 |
| 2005/0099403 | A1 | * | 5/2005 | Kraus et al. | 345/173 |
| 2007/0013662 | A1 |   | 1/2007 | Fauth | |
| 2008/0120559 | A1 |   | 5/2008 | Yee | |
| 2009/0066660 | A1 |   | 3/2009 | Ure | |
| 2010/0238119 | A1 | * | 9/2010 | Dubrovsky et al. | 345/169 |
| 2012/0119999 | A1 | * | 5/2012 | Harris | 345/169 |

\* cited by examiner

*Primary Examiner* — Chanh Nguyen
*Assistant Examiner* — Roy Rabindranath (57) ABSTRACT

Keyboard systems and methods are provided herein. In one embodiment, an overlay keyboard for touch screen devices includes a physical keyboard that can be mounted onto a touch screen device (e.g., a corded touch screen device or a touch screen mobile device) that provides a virtual keyboard (e.g., a software displayed touch screen), in which the physical keyboard can be overlaid onto the virtual keyboard of the touch screen device. When no key of the physical keyboard is pressed down, the physical keyboard does not trigger the touch screen of the touch screen device. When a key of the physical keyboard is pressed down, the physical keyboard touches the touch screen on a corresponding key of the virtual keyboard on the touch screen device, thereby causing the touch screen to detect that the corresponding key of the virtual keyboard has been pressed.

21 Claims, 9 Drawing Sheets

OVERLAY KEYBOARD FOR TOUCH SCREEN DEVICES

CROSS REFERENCE TO OTHER APPLICATIONS

This application claims priority to U.S. Provisional Patent Application No. 61/215,710 filed May 7, 2009 entitled OVERLAY KEYBOARD FOR TOUCH SCREEN DEVICES filed OVERLAY KEYBOARD FOR TOUCH SCREEN DEVICES which is incorporated herein by reference for all purposes.

BACKGROUND OF THE INVENTION

Users often have a difficult time adapting to virtual keyboards of touch screen devices, particularly virtual keyboards of small touch screen devices such as small touch screen mobile devices. These virtual keyboards are software displayed keyboards (e.g., displayed on a touch screen) that do not include physical keys that can be pressed down and often do not provide tactile feedback to users when keys are depressed as compared to physical keyboards. The keys on virtual keyboards of small touch screen devices are often too small and/or are placed too close together for users to easily differentiate adjacent keys, making it difficult for users to type without looking at the keys or type with more than one finger. Consequently, users often make more errors and require more time typing on a virtual keyboard as compared to typing on a physical keyboard.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Keyboard systems and methods are provided herein. In one embodiment, an overlay keyboard system for touch screen devices (e.g., touch screen mobile devices and corded touch screen devices) includes a physical keyboard that can be mounted onto a touch screen device that provides a virtual keyboard (e.g., software generated and displayed on the touch screen), in which the physical keyboard can be overlaid onto the virtual keyboard of the touch screen device. The virtual keyboard is software displayed keyboard that does not have physical keys that can be pressed down. The keys of the physical keyboard are configured to correspond to the keys of the virtual keyboard. When no key of the physical keyboard is pressed down, the physical keyboard does not touch or otherwise trigger the touch screen of the device. When a key of the physical keyboard is pressed down, the physical keyboard generates pressure, causes a capacitive discharge, creates a conductive circuit, blocks or creates an optical signal, or in other ways triggers the corresponding key of the virtual keyboard on the device, thereby causing the touch screen to detect that the corresponding key of the virtual keyboard has been pressed just as if it had been touched by a finger.

Figure 1:
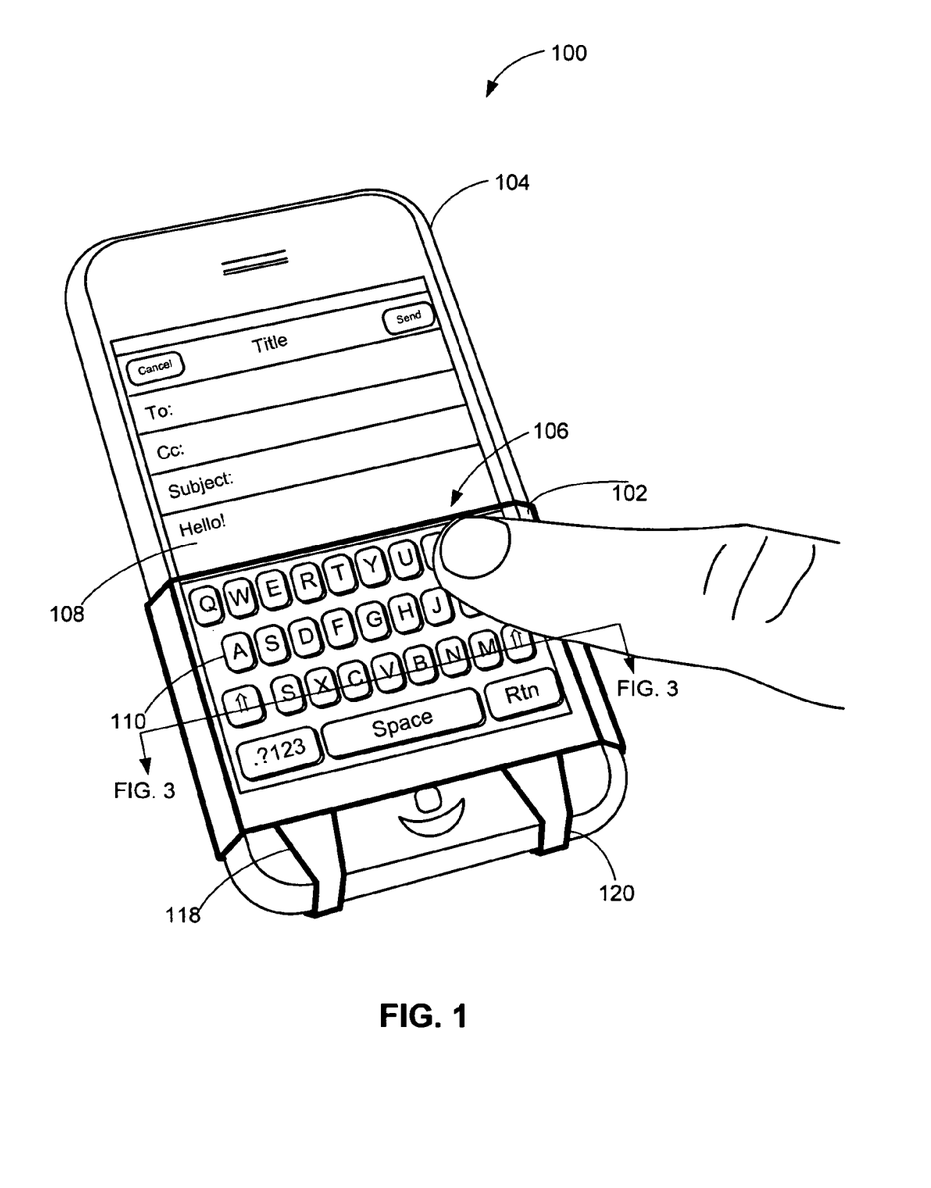
FIG. 1 is a diagram illustrating a keyboard system having a physical keyboard overlay for a virtual keyboard of a touch screen device configured for user input in accordance with some embodiments.

FIGS. 1 to 8 illustrate a keyboard system 100 in accordance with some embodiments. Referring to FIG. 1, FIG. 1 is a diagram illustrating the keyboard system 100 having a physical keyboard overlay 102 for a virtual keyboard 106 of a touch screen device 104 (e.g., a corded touch screen phone, cordless touch screen mobile phone, a touch screen laptop, a touch screen notebook such as Apple iPad and Hewlett-Parkard Slate, a touch screen entertainment/gaming device, a touch screen music/video device, a touch screen remote control, a touch screen desk phone, and a touch screen eBook device) for user input in accordance with some embodiments. As shown, the system 100 includes the physical keyboard 102 configured to be mounted over the touch screen device 104 for facilitating user input using the virtual keyboard 106 displayed on a touch screen 108 of the touch screen device 104. In some embodiments, a key selection and layout of the physical keys of the physical keyboard 102 correspond to the key selection and layout of the virtual keyboard 106. In some embodiments, the touch screen of the touch screen device 104 is a capacitive touch screen, and the physical keyboard overlay 102 provides an electrical connection/indicator (e.g., using a conductive probe tip that makes contact with the capacitive touch screen) when a physical key is pressed such that the capacitive touch screen of the virtual keyboard 106 senses that the corresponding soft key was pressed. In some embodiments, the physical keyboard overlay 102 rests on top of the touch screen (e.g., mechanically rests on the screen) of the touch screen device 104.

Figure 2:
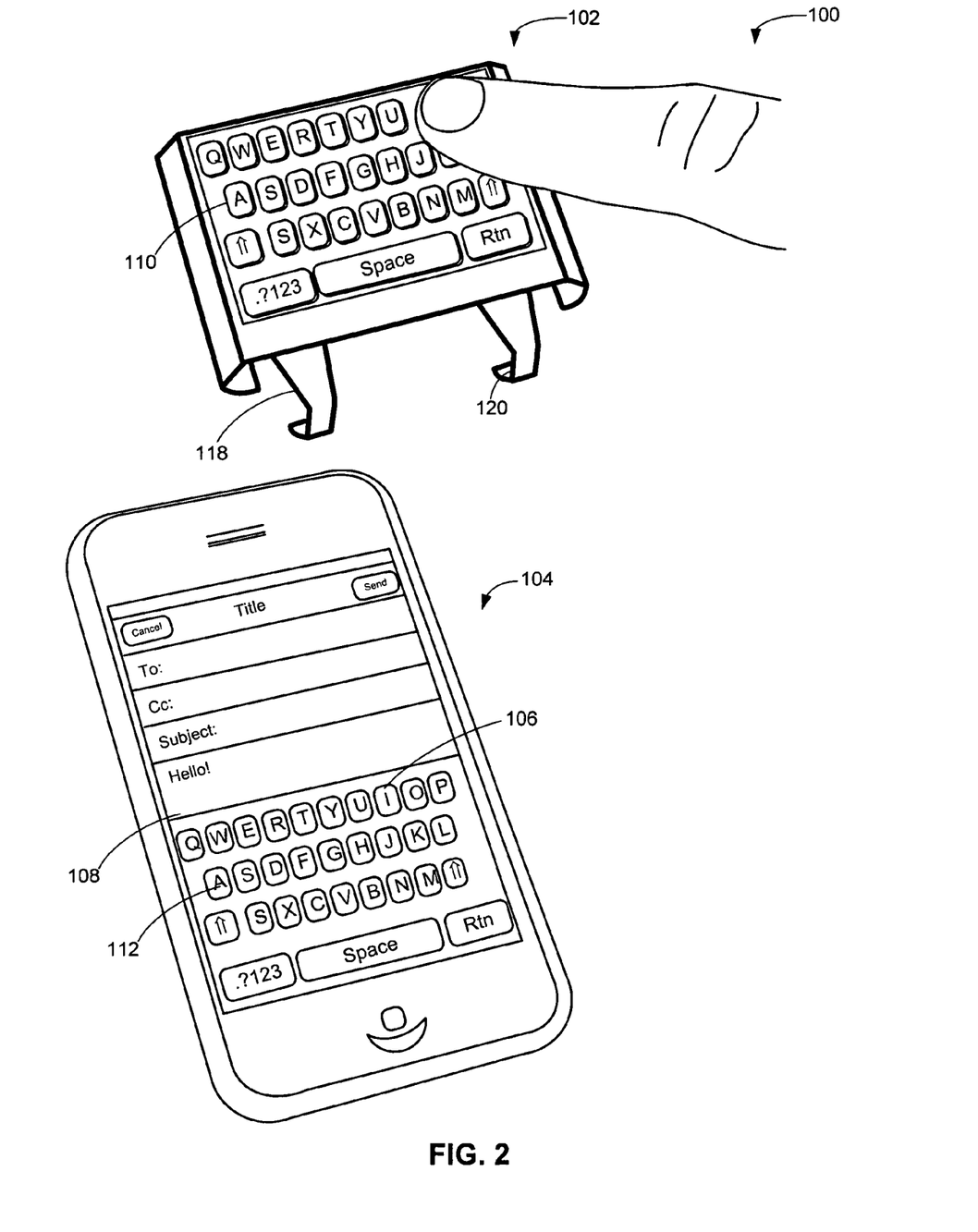
FIG. 2 is an exploded view of the keyboard system of FIG. 1, with the physical keyboard overlay detached from the touch screen device.

Referring to FIG. 2, FIG. 2 is an exploded view of the keyboard system of FIG. 1, with the physical keyboard overlay 102 detached from the touch screen device 104 and exposing the virtual keyboard 106 of the touch screen device 104. As shown, the key selection and layout of the physical keyboard overlay 102 and the virtual keyboard 106 are identical, and the soft keys 112 of the virtual keyboard 106 are identical in sizes and spacings compared to the keys 110 of the physical keyboard overlay 102.

Figure 3:
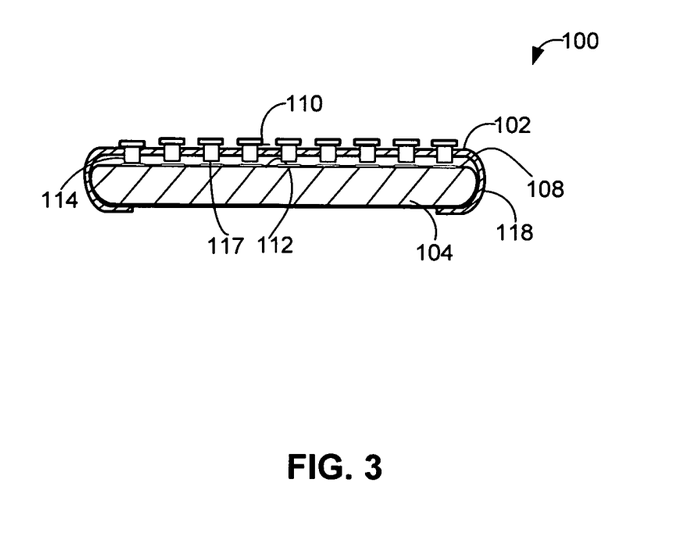
FIG. 3 is a cross-sectional view of the keyboard system of FIG. 1 in accordance with some embodiments.

Referring to FIG. 3, FIG. 3 is a cross-sectional view of the physical keyboard overlay 102 of FIG. 1 in accordance with some embodiments. As shown, the physical keyboard 102 includes a plurality of actuators 114, each coupled to a key of the plurality of keys 110 of the physical keyboard 102, in some examples via a plurality of connecting parts such as a plurality of pins (115 as shown in FIGS. 6A-F). When a physical key of the physical keyboard is depressed by a user, the corresponding actuator triggers a corresponding key of the virtual keyboard 106, by for example creating a pressure on, causing a capacitive discharge to, creating a conductive circuit in a corresponding key of the virtual keyboard 106, causing the touch screen to detect that the corresponding key of the virtual keyboard 106 has been depressed or otherwise selected by the user. The actuators 114 can be any suitable devices or mechanisms that generate pressure on or otherwise trigger a corresponding key of the virtual keyboard 106 when a key of the physical keyboard 102 is depressed. As an example, the actuators may be physical extensions, of the keys of the physical keyboard, such as vertical extensions as shown in FIG. 3 and angled extensions as shown in FIG. 7 and the keys in such cases can be angled to ensure one-on-one correspondence between the physical keyboard 102 and the virtual keyboard 106. The actuators 114 can include a plurality of pins 115 as shown in FIGS. 5 and 6A-F, where the pins can be silicon, plastic, rubber, metal or other suitable material conducive to implementing the various embodiments that can press down on the touch screen when keys of the physical keyboard is depressed. The actuators such as the pins of the actuators can be angled pins as shown or can include bends to ensure the one-on-one correspondence between the physical keyboard and the virtual keyboard. The actuators 114 can include a plurality of actuator tips 119. The actuators tips can be flexible or elastic and soft on the corners so that they would not create scratches on the touch screen. As another example, the actuators can be rocker-type actuators that include a plurality of rockers pivoted to pivot points. In another example, the actuators can include a diaphragm mechanism that pushes another pin when the keys of the physical keyboard are depressed. The actuators can also include electromechanical actuators, such as solenoid actuators.

Figure 4:
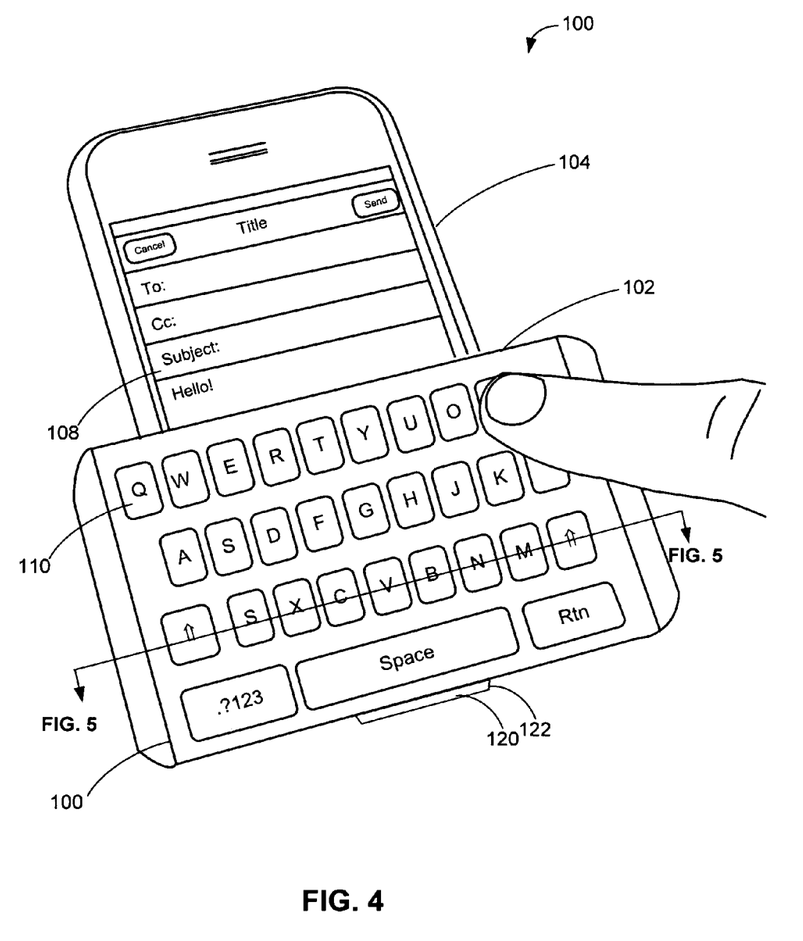
FIG. 4 is a diagram illustrating another keyboard system having a physical keyboard overlay for a virtual keyboard of a touch screen device for user input in accordance with some embodiments.

Referring to FIG. 4, FIG. 4 is a diagram illustrating another keyboard system 100 having a physical keyboard overlay 102 for a virtual keyboard 106 of a touch screen device 104 for user input in accordance with some embodiments. As shown, the physical keyboard 102 includes a plurality of physical keys 110. In some embodiments, a key selection and layout of the physical keys 110 correspond to the layout of the virtual keyboard 106. For example, the number of keys and type of keys can correspond for the physical keyboard and the virtual keyboard. As another example, the individual keys of the physical keys 110 of the physical keyboard overlay 102 can have a one-on-one correspondence to the soft keys 112 of the virtual keyboard 106 so that when a key is depressed on the physical keyboard 102 the touch screen of the touch screen device 104 will sense (e.g., detect) that a corresponding key of the virtual keyboard 106 has been depressed. In some embodiments, the physical keys 110 of the physical keyboard 102 are larger and/or more spread out than the soft keys 112 of the virtual keyboard 106, making it easier for users to differentiate adjacent keys without losing the correspondence between the virtual keyboard 106 and the physical keyboard 102. For example, the physical keys 110 of the physical keyboard 102 can be more spread out vertically and/or horizontally compared to the soft keys 112 of the virtual keyboard 106. In some embodiments, systems and methods disclosed herein provide software having instructions when executed by the touch screen device 104 causes the touch screen device 104 to display a virtual keyboard 106 having a layout that corresponds to the physical keyboard 102, in which the physical keys 110 of the physical keyboard 102 have a one-on-one correlation with the soft keys 112 of the virtual keyboard 106.

In some embodiments with touch screens which do not operate by detecting pressure on the touch screen but rather some other electrical property such as capacitive discharge or the completion of a conductive circuit, parts of the keyboard can rest directly on the touch screen. The physical keys drive actuators tips which touch the touch screen when pressed and which are made of materials that are capable of triggering the touch screen to register a touch when contact is made.

Figure 5:
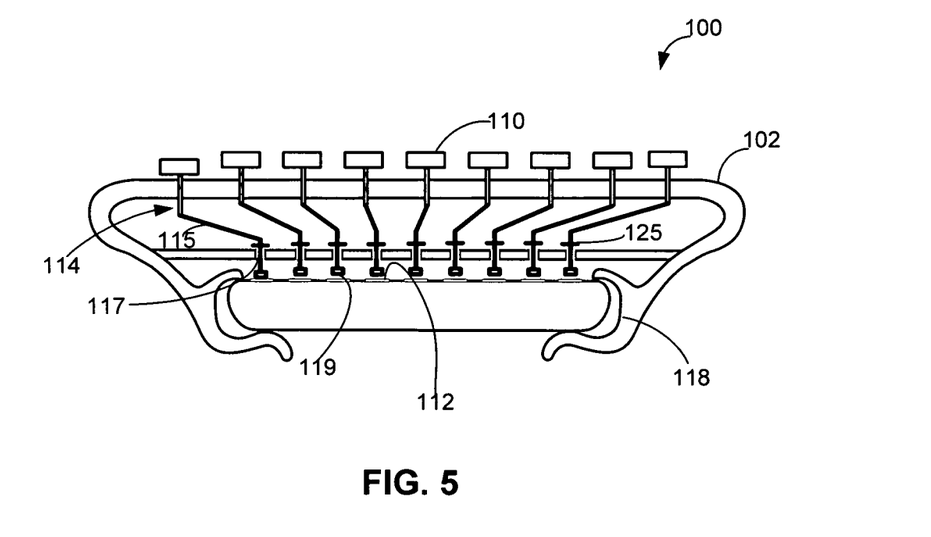
FIG. 5 is a cross-sectional view of the physical keyboard overlay of FIG. 4 in accordance with some embodiments.

Referring to FIG. 5, FIG. 5 is a cross-sectional view of the physical keyboard overlay 102 of FIG. 4 in accordance with some embodiments. As shown, the physical keyboard 102 includes a plurality of actuators 114, each coupled to a key of the plurality of keys 110 of the physical keyboard 102. When a physical key of the physical keyboard is depressed by a user, a tip 119 of the corresponding actuator creates a pressure on a corresponding key of the virtual keyboard 106, causing the touch screen to sense that the corresponding key of the virtual keyboard 106 has been depressed. In some embodiments, the actuators 114 include actuator tips 119 and pins 115 that connect the actuator tips to the physical keys. The pins 115 feed through channels 117 in the physical keyboard housing. The pins 115 can be constructed of the same or different material as compared to either the physical keys or the actuator tips, or from different material than either the physical keys or actuators tips. For example, the physical key and the pin can be constructed from a hard plastic, whereas the actuator tips that the pin connects to is constructed from a soft material, possibly conductive, as described herein. As another example, the physical key is constructed from plastic, the pin is constructed from metal, and the actuator tip that the pin connects to is again constructed from a soft material, possibly conductive.

In some embodiments, the actuators 114 such as actuator tips 119 are made of a material that is conductive so as to create a capacitive connection to the touch screen. In some embodiments, the conductive material is pliable and/or constructed from a material with some degree of elasticity. In such embodiments, when the actuator is pressed against the screen the actuator compresses to provide for a tolerance of actuator travel, a full contact between the screen and the actuator tip in the desired touch screen virtual key area, while ensuring that the pressure on the screen is below that which would cause damage to the touch screen. For example, there are many actuator materials that can be employed to achieve this combination of elasticity or softness and electrical conductivity, including a silicon compound, rubber compound, plastic compound, and/or other elastic material with conductive coating covering the actuator surface; or silicon compound, rubber compound, plastic compound or other elastic material with conductive filler material embedded into the actuator. Other suitable materials will be apparent to one of ordinary skill in the art.

Figure 6A:
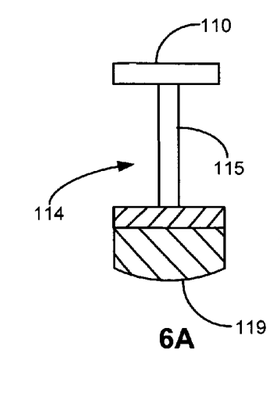
FIGS. 6A-6F are cross-sectional views of example actuators of a keyboard system in accordance with some embodiments.
Figure 6B:
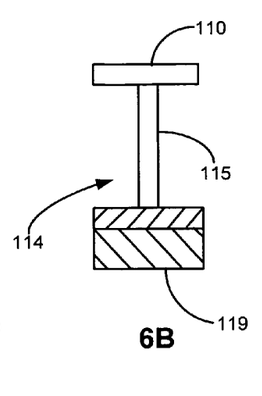
Figure 6C:
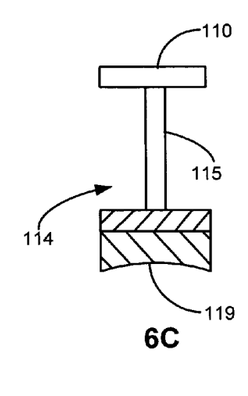
Figure 7:
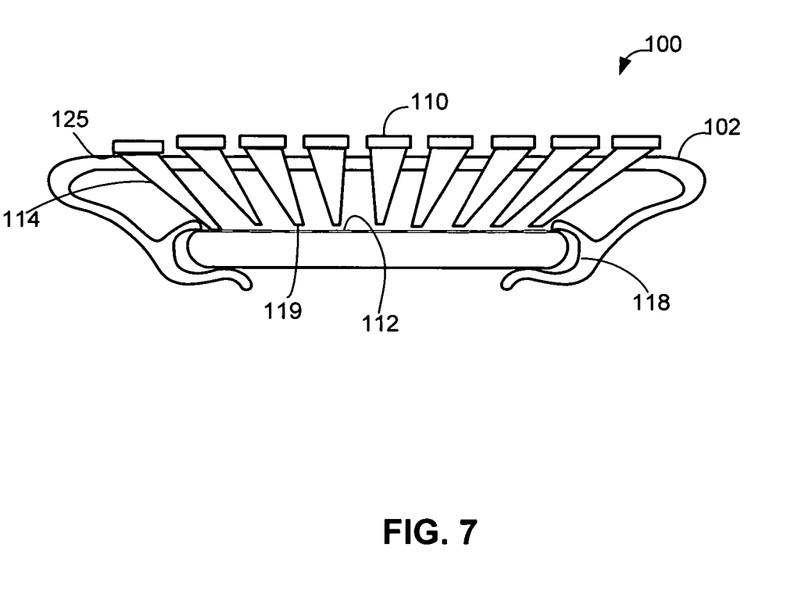
FIG. 7 is another cross-sectional view of the physical keyboard overlay of FIG. 4 in accordance with some embodiments.

FIGS. 6A through 6F are cross-sectional views of various embodiments of actuators that can be used in the keyboard system 100. In some embodiments, the shape of the actuator tip 119 that contacts the virtual keyboard is rounded, for example, slightly rounded or convex as depicted in FIG. 6A. In general, in such embodiments, the center of the rounded actuator tip 119 is positioned so that it contacts the virtual keyboard in the vicinity of the center of the virtual keyboard desired key location that corresponds to the physical key that depresses the actuator. In some embodiments, the shape of the actuator tip is flat as shown in FIG. 6B so that contact or pressure can be applied to a larger portion of the screen area, the portion of screen area corresponding again to the vicinity of the virtual keyboard key that corresponds to the physical keyboard actuator and key. In some touch screen design embodiments, a larger contact area or area of pressure may be used to reliably achieve touch screen recognition that the key is being depressed, while maintaining a reasonable amount of pressure required to achieve the recognition without damaging the touch screen and without requiring an inconvenient or impractical amount of pressure on the physical keyboard key. In some embodiments, the shape of the tip of the actuator is concave as shown in FIG. 6C so that the actuator first presses upon an area generally corresponding to the outer perimeter 123 of the virtual keyboard area corresponding to the desired key. For example, this variation on the actuator shape, in particular shape of the actuator tip, can also be helpful for achieving reliable touch screen recognition of the desired key being depressed while maintaining a reasonable amount of pressure on the touch screen and a reasonable amount of pressure required by the user to activate the key. For example, any or all of the above actuator shape embodiments can be implemented with the elastic or partially elastic actuator material embodiments described herein, with or without the conductive coating or embedded material embodiments also described herein.

Figure 6D:
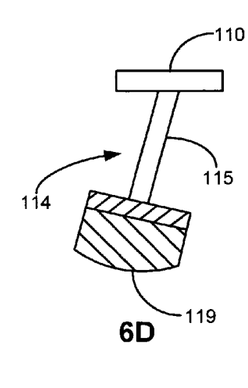
Figure 6E:
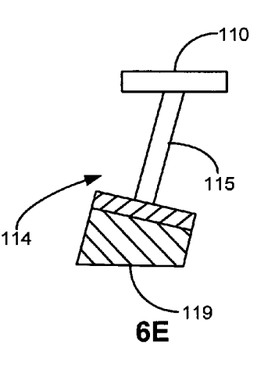
Figure 6F:
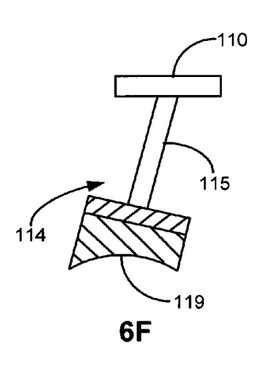

In some embodiments, if the actuators, pins, or physical keys are angled as discussed herein for the purpose of having a physical keyboard of different size or orientation than the virtual or touch screen keyboard, then the shape of the actuator can be modified to provide pressure or contact to the virtual keyboard or touch screen in the desired virtual key area. Examples for such embodiments are depicted in FIGS. 6D and 6E. FIG. 6D depicts an angled actuator tip with a convex surface, FIG. 6E depicts an angled actuator tip with a flat surface, while FIG. 6F depicts an angled actuator tip with a concave surface.

As shown in FIG. 5, the physical keyboard also includes a mounting structure 118 for mounting the physical keyboard onto the touch screen device 104. For example, the mounting can be fixed or detachable (e.g., as a slip-on keyboard, flip-on keyboard, or integrated with a cover or case/protector for the touch screen device 104). As another example, the mounting structure can be configured to mount the physical keyboard 102 over the touch screen so that the plurality of physical keys are overlaid on top of the soft keys 112 of the virtual keyboard 106 of the touch screen to ensure that when a key of the physical keyboard 102 is depressed, the touch screen senses that a corresponding key of the virtual keyboard 106 is depressed. For example, when the "A" key of the physical keyboard 102 is depressed, the touch screen senses that the "A" key of the virtual keyboard 106 is depressed. Thus, the physical keyboard 102 can be used to facilitate user input into the virtual keyboard 106. The mounting structure can be configured to mount the physical keyboard onto the touch screen device 104 in such a way that the physical keyboard 102 does not physically touch the touch screen surface when no key of the physical keyboard 102 is depressed, and when a key of the physical keyboard 102 is depressed, the physical keyboard 102 only touches or exerts pressure on a corresponding key of the virtual keyboard 106 so that the touch screen senses that the corresponding key of the virtual keyboard 106 is depressed.

In some embodiments, there is a positive stopping mechanism 125 that prevents the actuator from being depressed beyond a certain physical limit, so that a wide range of user pressure may be applied without damage to the touch screen device. For example, a positive stopping mechanism can be implemented in a variety of ways, with examples including a mechanical stop for the physical key (as shown in FIG. 7), a mechanical stop for the actuator (not shown), and/or a mechanical stop for a pin that connects the physical key to the actuator (as shown in FIG. 5). This type of positive stopping mechanism can also provide user tactile feedback so that the user knows when the key is sufficiently depressed, and the positive stopping mechanism can be combined with a further tactile feedback to the user such as a clicking sensation as is common in certain physical keyboards that do not connect to virtual or touch screen keyboards.

In some embodiments, the physical keyboard 102 also includes a positive reference mechanism or structure 120, such as a lock mechanism to ensure that the keys of the physical keyboard is lined up correctly with the keys of the virtual keyboard for keyboard entries and does not slide once it is in position on the touch screen device 104. The lock mechanism can be fixed or disengaged by a user with a certain level of exerted force to disengage the lock mechanism. For example, the lock mechanism 120 can be a clip, such as the clip 122 illustrated in FIG. 7 that engages the touch screen device 104 once the physical keyboard 102 is slid, snapped, or flipped into the correct position on the touch screen device 104.

In some embodiments, the physical keyboard 102 is attached to the device in a manner that provides a conductive electrical connection between the device case, through the keyboard apparatus and to the actuators. This electrical connection provides the electrical continuity between the device and the conductive media (actuator) that touches the screen for devices wherein such continuity is required to register the activation of the virtual key. The conductive electrical connection can be accomplished in a number of ways that will be apparent to one of ordinary skill in the art.

In some embodiments, the physical keyboard 102 is attached to the touch screen device 104 via any suitable mechanism and structures. For example, the physical keyboard 102 can be a fixed attachment (e.g., screwed on), slipped on cover/attachment, wrap around cover covering the back and sides with a small lip on top where the screen is, a snap on/off attachment, flip down with a hinge, or a slide on/off attachment of the device. The physical keyboard can also form a part of/integrated with a hard cover of the device.

In some embodiments, various systems and methods disclosed herein provide computer software having executable instructions, when executed by the touch screen device 104 cause the device 104 to display a virtual keyboard 106 having a layout that will facilitate the operation of the physical keyboard 102 over the virtual keyboard 106.

FIG. 7 is another cross-sectional view of the physical keyboard overlay of FIG. 4 in accordance with some embodiments. As shown, the physical keyboard 102 includes a plurality of actuators 114, each coupled to a key of the plurality of keys 110 of the physical keyboard 102, in which each of the actuators are angled to properly align the physical keys 110 of the physical keyboard 102 with the soft keys 112 of the virtual keyboard 106.

Figure 8:
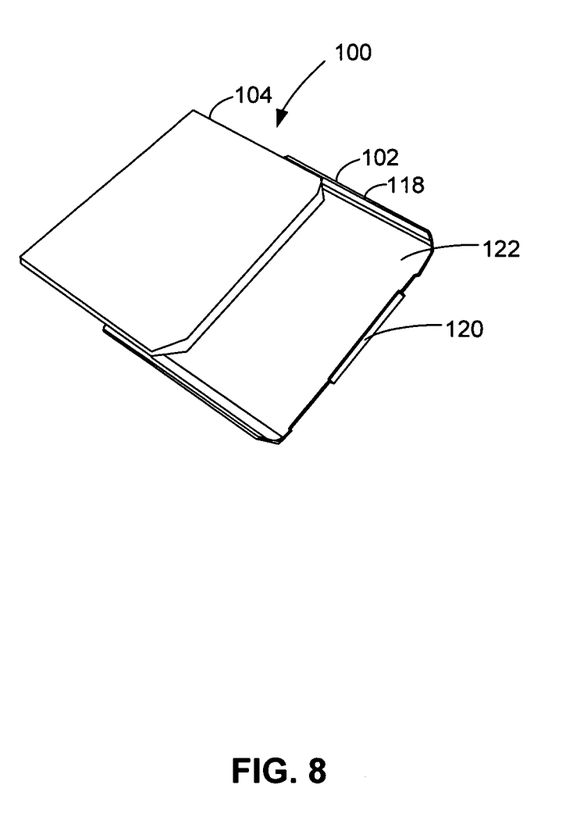
FIG. 8 is schematic diagram of a slip-on physical keyboard in accordance with some embodiments.

FIG. 8 is schematic diagram of a slip-on physical keyboard in accordance with some embodiments. As shown, FIG. 7 is schematic diagram of an underside of a slide-on physical keyboard system 100 in accordance with some embodiments. The physical keyboard 102 forms a part of a device cover 122 that slides on the device 104. A tab 120 with a lock-in mechanism secures the physical keyboard 102 to the device 104 once it is in position.

Figure 9:
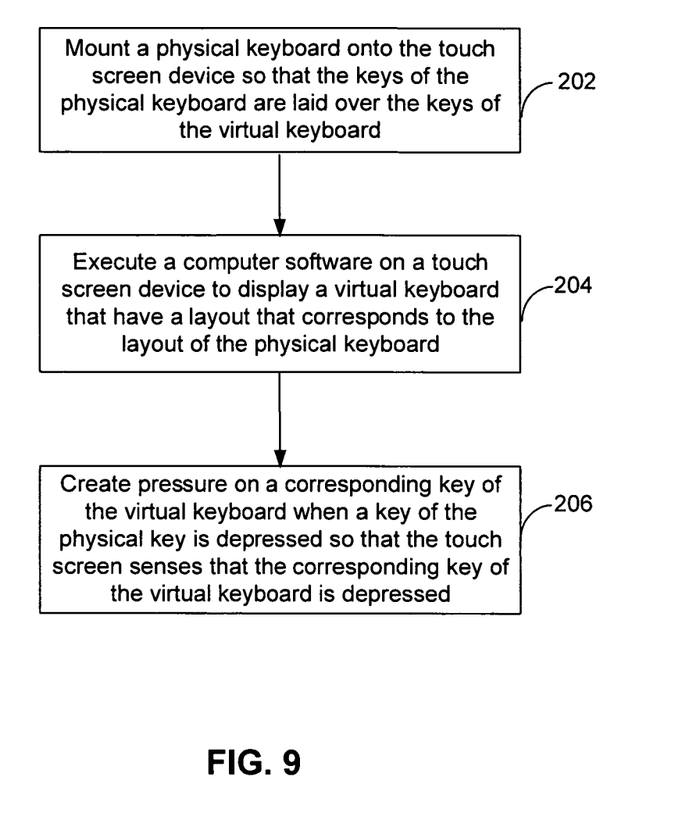
FIG. 9 is a flow diagram of a method for using a physical keyboard overlaid on top of a virtual keyboard of a touch screen device to facilitate user input in accordance with some embodiments.

FIG. 9 is a flow diagram of a method for, using a physical keyboard overlaid on top of a virtual keyboard of a touch screen device to facilitate user input in accordance with some embodiments. For example, the method can be implemented using the system 100 of FIGS. 1 to 7. At stage 202, a physical keyboard is attached or mounted to the device, in which the physical keyboard is attached or mounted to the device in such a way that the physical keyboard does not touch the touch screen of the device. At stage 204, computer software is executed on the device to display a virtual keyboard having a layout that corresponds to the physical keyboard. For example, the displayed virtual keyboard can have a key layout that matches that of the physical keyboard, or can have keys that are spaced more like the physical keyboard. At stage 206, a pressure via an actuator is created on a key of a virtual keyboard displayed on the touch screen of the device when a corresponding key of the physical keyboard is depressed so that the touch screen senses the corresponding key of the virtual keyboard is depressed or otherwise actuated. For example, when a user depresses the physical key "A" of the physical keyboard, it causes the virtual key "A" of the virtual keyboard to be actuated and results in a user input of "A" to be registered with the device. The mounting mechanism can be fixed or detachable and via various mechanisms or structures as discussed herein. The various types of actuators are also discussed herein.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
   a physical keyboard overlay configured for being removably attached to a touch screen display of a touch screen of a handheld limited-display device,
   wherein the touch screen display supports visual display of a limited-size virtual keyboard having a plurality of virtual keys,
   wherein the physical keyboard overlay comprises a plurality of physical keys, wherein one or more physical keys of the plurality of physical keys directly correspond to one or more corresponding virtual keys,
   wherein the physical keyboard overlay comprises at least a first physical key that is positioned over a corresponding first virtual key by a first alignment offset, such that the first physical key does not directly overlay the corresponding first virtual key, when the physical keyboard overlay is removably attached to the handheld limited-display device; and
   at least a first actuator in a diagonal operational relationship with both the first physical key and the corresponding first virtual key, wherein the first actuator engages the first virtual key, in response to user interaction with the first physical key.

2. The system recited in claim 1, wherein the handheld limited-display device is selected from one or more of the following: a touch screen phone, a touch screen laptop, a touch screen notebook, a touch screen entertainment/gaming device, a touch screen music/video device, and a touch screen eBook device.

3. The system recited in claim 2, wherein the touch screen phone is a touch screen mobile phone.

4. The system recited in claim 2, wherein the touch screen phone is a corded touch screen phone.

5. The system recited in claim 1, further comprising a mount mechanism, wherein the mount mechanism is coupled to the physical keyboard overlay for providing a fixed physical keyboard overlay for the handheld limited-display device, wherein the mount mechanism is integrated with a device cover.

6. The system recited in claim 1, wherein the physical keyboard overlay further includes a plurality of conductive probe tips.

7. The system recited in claim 1, further comprising a mount mechanism, wherein the mount mechanism is coupled to the physical keyboard overlay for providing a fixed physical keyboard overlay for the handheld limited-display device, wherein the mount mechanism includes one or more of the following: a device cover, a slip-on mechanism, a flip-on mechanism, and a lock mechanism.

8. The system recited in claim 1, wherein a size of one or more of the plurality of physical keys of the physical keyboard overlay is larger than one or more corresponding virtual keys of the limited-size virtual keyboard.

9. The system recited in claim 1, further comprising:
   a processor configured to:
   arrange one or more of plurality of virtual keys of the limited-size virtual keyboard based on an arrangement of the plurality of physical keys of the physical keyboard overlay.

10. The system recited in claim 1, wherein the physical keyboard overlay comprises a plurality of actuators, wherein one of the plurality of actuators triggers a virtual key upon triggering of a corresponding physical key.

11. The system of claim 10, wherein at least one of the plurality of actuators is angled from the physical keys to the virtual keys.

12. The system of claim 1, wherein the plurality of physical keys of the physical keyboard overlay are more spread out than the virtual keys of the limited-size virtual keyboard.

13. The system of claim 1, wherein the plurality of physical keys of the physical keyboard overlay are at least one of horizontally or vertically more spread out than the virtual keys of the limited-size virtual keyboard.

14. The system of claim 1, further comprising a stopping mechanism, wherein the stopping mechanism provides a user with tactile feedback when a physical key has been sufficiently depressed.

15. The system of claim 14, wherein the stopping mechanism provides a clicking sensation when the physical key has been sufficiently depressed.

16. The system of claim 1, wherein the physical keyboard overlay comprises a plurality of actuators, wherein one of the plurality of actuators triggers a virtual key upon triggering of a corresponding physical key, wherein an end of at least one of the plurality of actuators that physically contacts the corresponding virtual key comprises an angled shape.

17. A computer program product, the computer program product being embodied in a non-transitory computer readable storage medium and comprising instructions for: displaying a virtual keyboard on the touch screen of the device so that at least a subset of a plurality of physical keys of a physical keyboard overlaid on the virtual keyboard correspond to a plurality of virtual keys of the virtual keyboard, and where actuation of each of the subset of physical keys of the physical keyboard would trigger a corresponding virtual key of the virtual keyboard, wherein the physical keyboard is configured for being removably attached to the touch screen of a handheld limited-display device, wherein the touch screen supports visual display of a limited-size virtual keyboard having a plurality of virtual keys, wherein the physical keyboard overlay comprises a plurality of physical keys, wherein one or more physical keys of the plurality of physical keys directly correspond to one or more corresponding virtual keys, wherein the physical keyboard comprises at least a first physical key that is positioned over a corresponding first virtual key by a first alignment offset, such that the first physical key does not directly overlay the corresponding first virtual key, when the physical keyboard overlay is removably attached to the handheld limited-display device, and wherein at least a first actuator in a diagonal operational relationship with both the first physical key and the corresponding first virtual key, wherein the first actuator engages the first virtual key, in response to user interaction with the first physical key.

18. The computer program product of claim 17, wherein the hand held limited-display device is selected from one or more of the following: a touch screen phone, a touch screen laptop, a touch screen notebook, a touch screen entertainment/gaming device, a touch screen music/video device, and a touch screen eBook device.

19. The computer program product recited in claim 18, wherein the touch screen phone is a touch screen mobile phone.

20. The computer program product recited in claim 18, wherein the touch screen phone comprises a corded touch screen phone.

21. A system, comprising:
- a physical keyboard overlay configured for being removably attached to a touch screen display of a touch screen of a handheld limited-display device, wherein the touch screen display supports visual display of a limited-size virtual keyboard having a plurality of virtual keys,
- wherein the physical keyboard overlay comprises a plurality of physical keys, wherein one or more physical keys of the plurality of physical keys directly correspond to one or more corresponding virtual keys,
- wherein the physical keyboard overlay comprises at least a first physical key that is positioned over a corresponding first virtual key by a first alignment offset, such that the first physical key does not directly overlay the corresponding first virtual key, when the physical keyboard overlay is removably attached to the handheld limited-display device,
- wherein at least a first actuator in a diagonal operational relationship with both the first physical key and the corresponding first virtual key, wherein the first actuator engages the first virtual key, in response to user interaction with the first physical key, and
- wherein a physical key of a row of the plurality of physical keys of the physical keyboard is aligned in a same direction as a plurality of other physical keys of the row.

* * * * *